July 12, 1949.                    J. D. GLEASON                    2,476,088
                           COMBINED LEADER AND SINKER
                              Filed Jan. 17, 1947
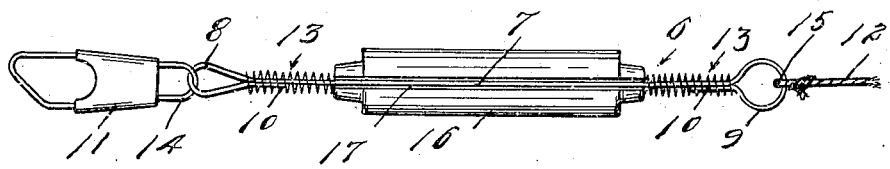
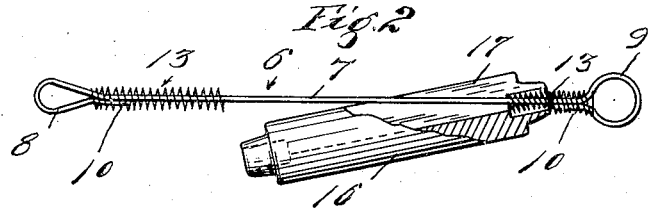
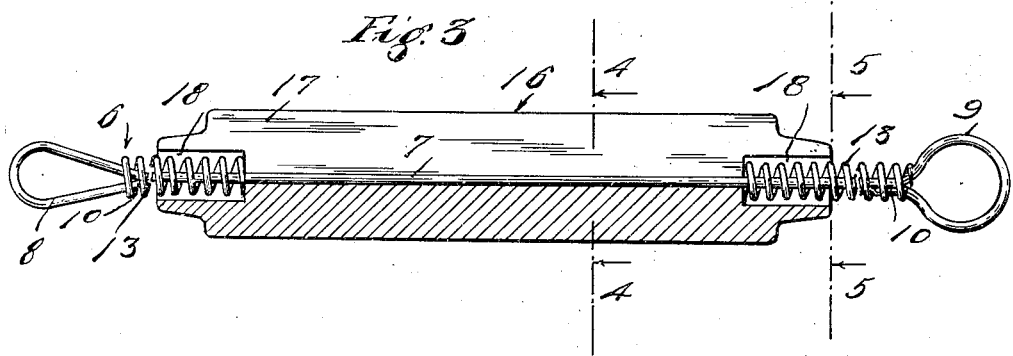
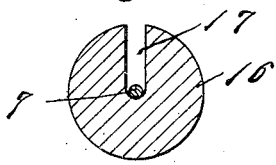 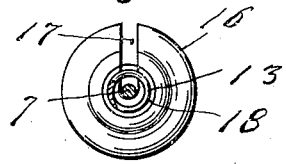
INVENTOR.
John Douglas Gleason
BY Harry W. Kilgore
Attorney Patented July 12, 1949

2,476,088

UNITED STATES PATENT OFFICE 2,476,088

COMBINED LEADER AND SINKER

John Douglas Gleason, Minneapolis, Minn., assignor to The Paul Bunyan Bait Company, Minneapolis, Minn., a corporation of Minnesota Application January 17, 1947, Serial No. 722,682

1 Claim. (Cl. 43—52)

My invention relates to angler equipment and accessories such as sinkers and fishing hook leaders.

One of the principal objects of this invention is to provide a novel leader that affords a mount and adapter for a sinker, in the form of a substantially rigid wire-like rod having on opposite end portions a pair of coiled springs that are readily attachable and detachable to the especially formed ends of a novel sinker. This rod has at its end portion open loops, normally closed by the springs, to accommodate a safety catch and a fishing line.

Another principal object of this invention is to provide adapter springs standardized in size and a novel sinker whose end portions are formed to accommodate the practical type of adapter springs employed, said sinker being round and elongated in shape, the diameter thereof determining the weight.

In actual practice, there will be provided a series of sinkers which, in general appearance, look alike but vary in weight, whereby to permit the desired degree of weight to be selected according to the use to which the sinker is to be put.

Other objects of the invention will be apparent from the following description, and accompanying drawing.

To the above end, generally stated, the invention consists of the novel devices and combination of devices hereinafter described and defined in the claim.

In the accompanying drawing, which illustrates the invention, like characters indicate like parts throughout the several views.

Referring to the drawing:

Fig. 1 is an elevational view of the improved combined leader and sinker;

Fig. 2 is a fragmentary view corresponding to Fig. 1, with the exception that the sinker is shown partly removed from the leader and a portion thereof is broken away and sectioned;

Fig. 3 is a fragmentary view, on an enlarged scale, showing the leader in elevation and the sinker in central longitudinal section;

Fig. 4 is a detail view in transverse section, taken on the line 4—4 of Fig. 3; and Fig. 5 is a view principally in end elevation with the rod and adapter spring sectioned on the line 5—5 of Fig. 3.

The improved leader 6 is in the form of a substantially rigid wire-like rod 7, the end portions of which are folded upon themselves and shaped to form opposite open loops 8 and 9. It is important to note that the extreme outer end portions 10 of the rod 7, outwardly of the loops 8 and 9, extend parallel to the main body portion of the rod and in close contact therewith.

A safety catch 11 is attached to the loop 8 for holding a fishing hook or the leader of a fishing hook, not shown, and a fishing line 12 is attached to the loop 9.

The sinker adapter for the leader 6 is a pair of opposing compressible expansion coiled springs 13 that encircle the rod 7 at opposite end portions. These springs 13, at their outer end portions, loosely engage, the one the loop 8 and the other the loop 9, as bases of resistance. It will be noted that the springs 13 encircle the end portions 10 of the rod 7 as well as the main body thereof and thereby afford closures for the open loops 8 and 9.

The safety catch 11 has a loop 14 that is interlocked with the loop 8. This loop 14 may be attached to or detached from the loop 8 simply by moving the adjacent spring 13 endwise on the rod 7 to uncover the respective rod end portion 10 and thereby permit the safety catch loop 14 to be inserted between said end portion and the main body of the rod 7.

The fishing line 12 is tied to form a loop 15 interlocked with the loop 9. This loop 15 may be attached to or removed from the loop 9 in the same manner that the safety catch loop 14 is attached to or removed from the loop 8.

Referring now in detail to the improved sinker 16, which, as shown, is elongated, round in cross-section and of a constant diameter except its end portions which are of a reduced diameter and curved to give the sinker 16 a finished and neat appearance: A longitudinal slot 17 is formed in the sinker 16 and extends through one side and opposite ends thereof. The depth of the slot 17 is such that the long axis of the rod 7, when resting on the bottom thereof, is coincident with the long axis of the sinker 16.

In the end portions of the sinker 16 are seats 18 for the inner end portions of the springs 13 which releasably hold the sinker 16 on the rod 7 between the springs 13. These seats 18 are formed by bores in the end portions of the sinker 16 at the long axis thereof and said end portions of the sinker 16 cap the inner end portions of the springs 13 in the seats 18.

To apply the sinker 16 to the leader 6, the rod 7 is first inserted into the slot 17 while said sinker is held obliquely to the rod 7 and then said sinker is moved endwise to enter the adjacent spring 13 into the respective seat 18, further endwise movement of the sinker 16 will compress the spring 13 sufficiently to permit the sinker 16 to clear the other spring 13 and be moved into axial alignment with the rod 7.

Next, the sinker 16 is moved endwise on the rod 7 to enter the other spring 13 into the respective seat 18. Upon releasing the sinker 16, relative to the leader 6, the tension of the springs 13 will equalize and hold the sinker 16 centered therebetween.

To remove the sinker 16 from the leader 6, it is only necessary to move the sinker 16 endwise on the rod 7 to compress one of the springs 13 sufficiently to uncap the other spring 13 and thus permit the sinker 16 to be moved endwise and angularly relative to the leader 6, to uncap the other spring 13 and thus release said sinker.

As heretofore stated, the light weight sinkers will be slender, while the heavier ones, not shown, will have the same shape but will be of larger diameter. In actual manufacture, a plurality of sinkers of different weight will be furnished, depending on the needs and requirements of the fisherman.

All sinkers 16 will have the same slot 17 and the same seats 18 so that all matching and co-acting elements may be standardized. In other words, the leader may be standardized to accommodate selectively employed sinkers of different weights.

From what has been said, minor changes in shape, size and arrangement of details coming within the scope of the invention herein claimed may be resorted to in actual practice, if desired.

What I claim is:

A sinker of the class described comprising a rod, the end portions of which are folded upon themselves to afford loops, an elongated sinker member provided with a longitudinal slot opening through one side and its opposite ends, said slot being adapted to fit over the intermediate portion of the rod, said rod between its loops being materially longer than the sinker, said sinker member having in its end portions relatively deep recessed spring seats, and a pair of relatively long compressible expansion springs encircling the rod with their inner ends mounted in said seats and with their outer ends engaging the loops as bases of resistance, and yieldingly holding the sinker member centered between the loops, said springs being of sufficient length to permit one thereof to be compressed by endwise movement of the sinker member to remove the sinker member from the other spring when fully expanded.

JOHN DOUGLAS GLEASON.

REFERENCES CITED

The following references are of record in the file of this patent:

UNITED STATES PATENTS

| Number | Name | Date |
| --- | --- | --- |
| 279,206 | Van Altena | June 12, 1883 |
| 326,134 | McNeal | Sept. 15, 1885 |
| 575,674 | Woodward | Jan. 19, 1897 |
| 1,371,170 | Johnson | Mar. 8, 1921 |
| 2,219,983 | Evenson | Oct. 29, 1940 |